United States Patent [19]

Eckert

[11] Patent Number: 4,622,651

[45] Date of Patent: Nov. 11, 1986

[54] ELECTRONIC POSTAGE METER HAVING PIEZOELECTRIC AUDIO TRANSDUCER ENERGIZED BY STEPPING MOTOR DRIVER CIRCUIT

[75] Inventor: Alton B. Eckert, Norwalk, Conn.

[73] Assignee: Pitney Bowes Inc., Stamford, Conn.

[21] Appl. No.: 486,129

[22] Filed: Apr. 18, 1983

[51] Int. Cl.⁴ ........................ G08B 21/00; G06F 15/20

[52] U.S. Cl. .................................... 364/900; 340/679; 364/464

[58] Field of Search ........................ 340/500, 521, 679; 364/464, 900

[56] References Cited

U.S. PATENT DOCUMENTS

| | | | |
|---|---|---|---|
| Re. 31,875 | 4/1985 | Check, Jr. et al. | 364/900 |
| 3,978,457 | 8/1976 | Check, Jr. et al. | 364/200 |
| 4,093,999 | 6/1978 | Fuller et al. | 364/900 |
| 4,097,923 | 6/1978 | Eckert, Jr. et al. | 364/900 |
| 4,224,613 | 9/1980 | Kaiser et al. | 340/679 |
| 4,280,180 | 7/1981 | Eckert et al. | 364/464 |
| 4,287,825 | 9/1981 | Eckert, Jr. et al. | 101/91 |
| 4,301,507 | 11/1981 | Soderberg et al. | 364/464 |
| 4,336,529 | 6/1982 | Buan | 200/5 A |
| 4,442,501 | 4/1984 | Eckert, Jr. et al. | 364/900 |
| 4,481,604 | 11/1984 | Gilham et al. | 364/900 |
| 4,519,048 | 5/1985 | Abellana et al. | 364/464 |

*Primary Examiner*—Errol A. Krass

*Assistant Examiner*—Edward R. Cosimano

*Attorney, Agent, or Firm*—Charles G. Parks, Jr.; Albert W. Scribner; William D. Soltow, Jr.

[57] ABSTRACT

An electronic postage meter includes a settable mechanism for printing postage with electronic accounting circuits coupled to the printing mechanism and a value selection control circuit for controlling the value set on the printing mechanism. An audible alarm device is mounted within the meter housing and is connected to be controlled by the microcomputer. The audible alarm device is selectively energized by the microcomputer to alert the meter user of the existence of predetermined conditions. The value selection control circuit may include a winding which is adapted to be energized under control of the microcomputer to cause the value selection control circuit to operate to control the value to which the printing mechanism is set. The microcomputer is operable to energize the winding at a first frequency which will cause the audible alarm device to emit an audible sound but will not cause the winding to cause the value selection control circuit to operate to control the value to which the printing mechanism is set. The microcomputer is further operable to energize the winding at a second frequency which will cause the value selection control circuit to operate to control the value to which the printing mechanism is set but will not cause the audible alarm device to emit an appreciable audible sound.

21 Claims, 5 Drawing Figures

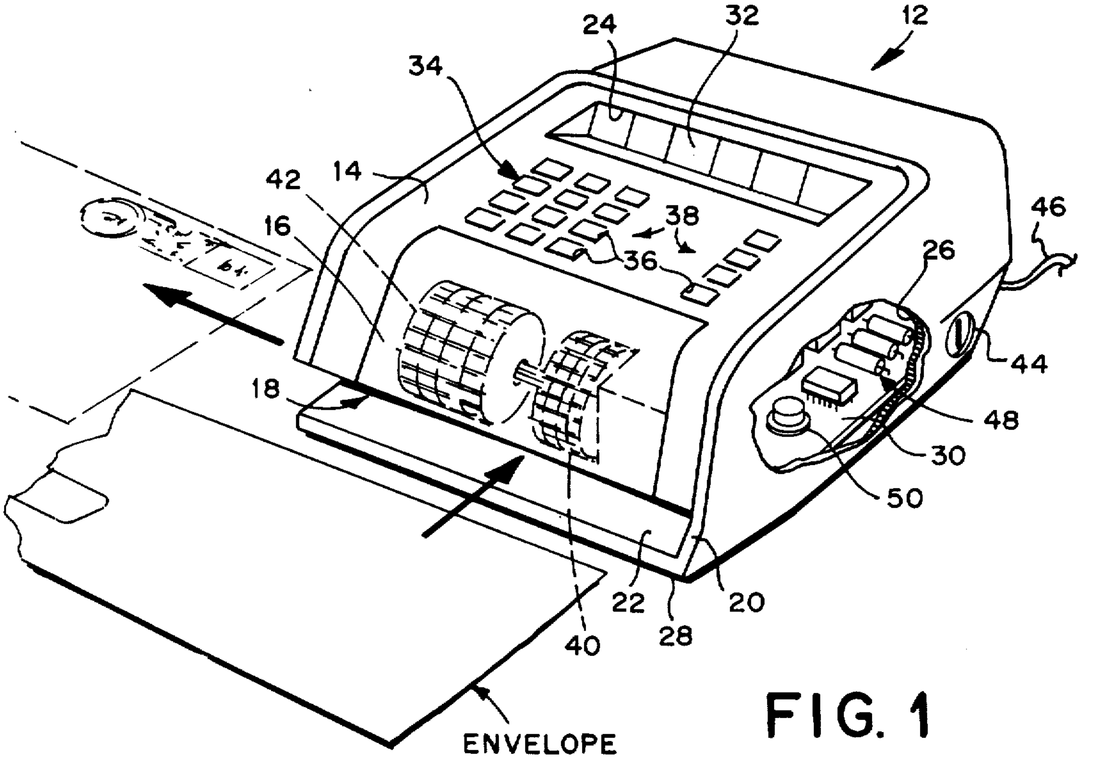
FIG. 1
FIG. 3
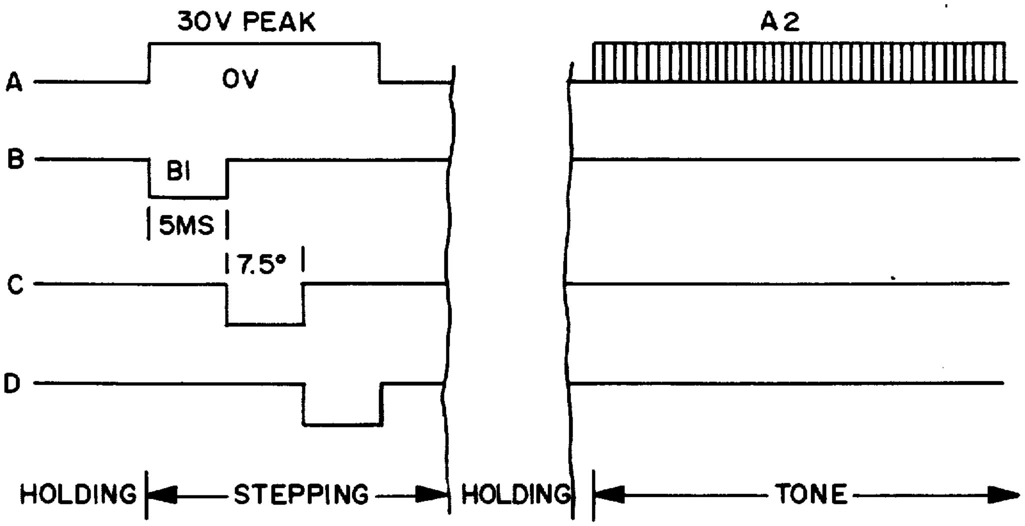

FIG. 2a
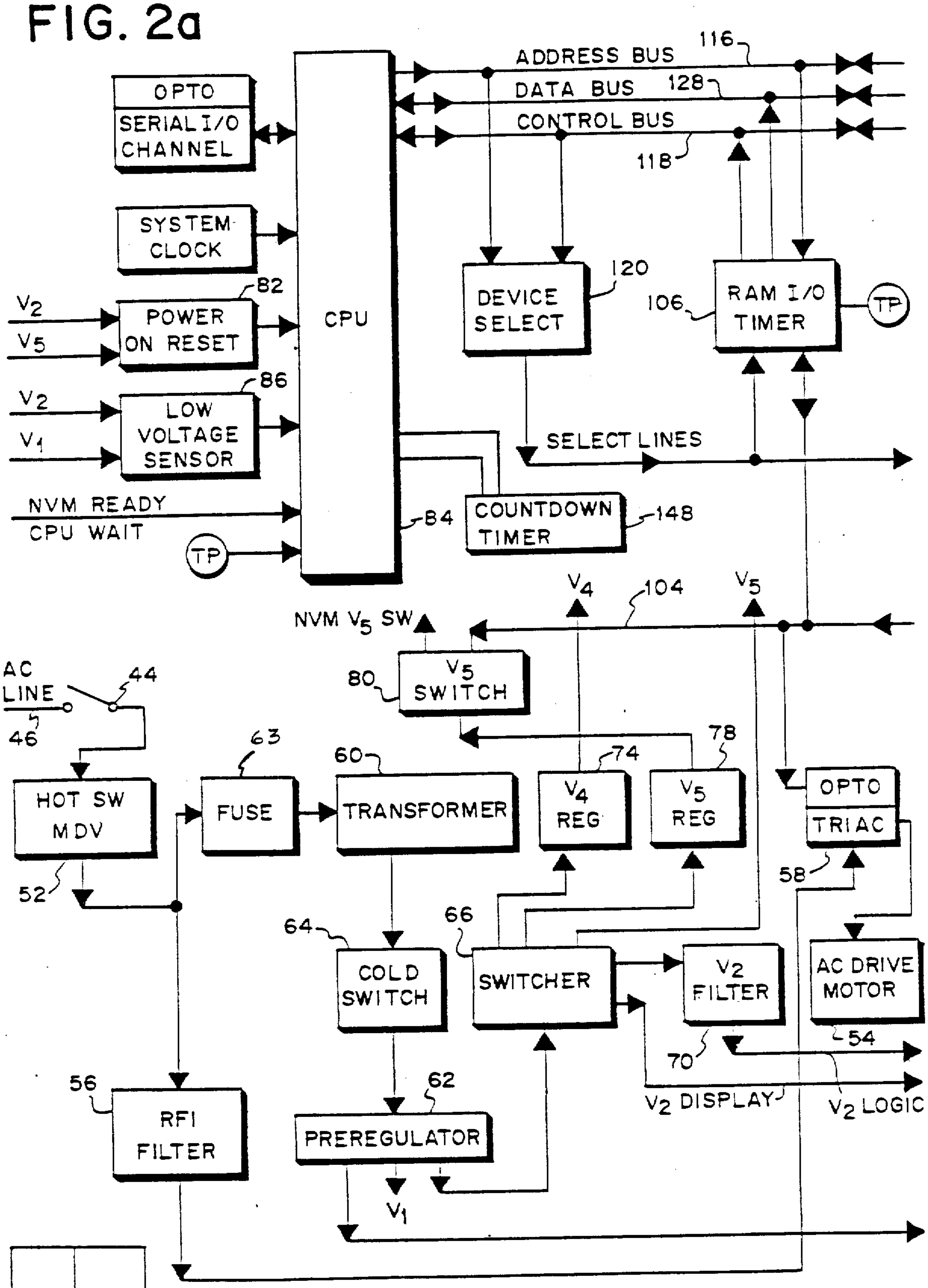
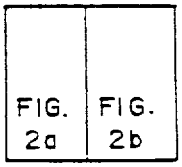
FIG. 2

ELECTRONIC POSTAGE METER HAVING PIEZOELECTRIC AUDIO TRANSDUCER ENERGIZED BY STEPPING MOTOR DRIVER CIRCUIT

FIELD OF THE INVENTION

The present invention relates to electronic postage meter warning systems and, more particularly, to electronic postage meter warning systems employing piezoelectric audio transducers energized by the meter value selection control circuit.

BACKGROUND OF THE INVENTION

Postage meters are mass produced devices for printing a defined unit value for governmental or private carrier delivery of parcels and envelopes. The term postage meter also includes other like devices which provide unit value printing such as tax stamp meters. Postage meters include internal accounting devices which account for postage value representation which is stored within the meter and is printed by the meter. As the result, postage meters must possess an extremely high reliability to avoid the loss of user or government funds stored within the meter.

Electronic postage meters have been developed with electronic accounting circuitry. Postage meter systems of this type are disclosed in U.S. Pat. No. 3,978,457 for MICROCOMPUTERIZED ELECTRONIC POSTAGE METER SYSTEM; in U.S. Pat. No. 4,301,507 for ELECTRONIC POSTAGE METER HAVING PLURAL COMPUTING SYSTEMS; and, in U.S. Pat. No. 4,559,443 for INITIALIZING THE PRINT WHEELS IN AN ELECTRONIC POSTAGE METER. The electronic accounting circuits of the meter include non-volatile memory capability for storing postage accounting information. The memory function in the electronic accounting circuits have replaced the function served in mechanical postage meters by mechanical accounting registers. The non-volatile memory and value selection in the electronic postage meters of the aforementioned patents as well as other meter functions are operated under microcomputer control.

Postage meters with mechanical accounting registers are not subject to many of the problems encountered by electronic postage meters. Conditions cannot normally occur in postage meters with mechanical registers that prevent, for example, accounting for a printing cycle or which result in the loss of data stored in the mechanical registers. This is not the case with electronic postage meters. Electronic components are subject to the effects of electromagnetic radiation which can affect their operation. Thus, precautions must be taken as for example by proper shielding to protect the meter's electrical components from the effects of electromagnetic radiation. Mechanical security must, of course, also be provided. Moreover, in electronic postage meters, the reliability of the meter is dependent, in part, on the reliability of the electronic components including the microcomputer with its related circuitry and the meter non-volatile memory. Accordingly, it has been noted that it is desirable to have high reliability in electronic postage meters.

SUMMARY OF THE INVENTION

The present invention is believed to result in improved reliability for an electronic postage meter. It further provides the improved reliability with a minimal increase in cost by utilizing existing circuits in a particularly advantageous manner.

It is believed that the reliability of electronic postage meters can be increased by reducing the amount of time the meter is left energized. It has been discovered that the meter operator can be alerted to the fact that the electronic postage meter has been turned on or energized for a predetermined period of time without a meter operation occurring, such as imprinting of postage or setting of meter values.

The present invention enables an audio warning to be provided to a meter user in a manner that requires a minimal addition of components over prior electronic postage meters and, thus, a minimal increase in manufacturing cost. Moreover, by employing the present invention, electronic postage meters, for example, of the type disclosed in the above-noted U.S. Pat. No. 4,559,443 for INITIALIZING THE PRINT WHEELS IN AN ELECTRONIC POSTAGE METER, can be retrofitted with an audio warning arrangement at minimal cost and by adding only one component and by changing the microcomputer control of the value selection control circuit, without the need to eliminate or rearrange the existing physical meter structure.

The circuit to provide a warning to the user is positioned within the meter in a location that does not compromise the mechanical or electrical security of the meter. For example, the placement of a warning device is such that the immunity of the meter to the effects of electromagnetic radiation is not compromised by the inclusion of the device. Thus, the warning device cannot be inadvertently mechanically or electrically energized which could cause degradation of operation of the meter. This is particularly critical because improper operation could result in a loss of funds to a user or could result in the meter being removed from service.

In accordance with the present invention, an electronic postage meter includes a settable mechanism for printing postage and electronic accounting circuits coupled to the printing mechanism for accounting for postage printed by the printing mechanism. A value selection control circuit is provided which is adapted to control the value to which the settable printing mechanism is set. The electronic accounting circuits include a microcomputer which controls the operation of the value selection circuit. The electronic accounting circuits, the printing mechanism and the value selection control circuit are all positioned within a housing to provide mechanical security and electromagnetic radiation shielding for the components. An audible alarm device is mounted within the meter housing and is connected to be controlled by the microcomputer. The audible alarm device is selectively energized by the microcomputer to alert the meter user of the existence of predetermined conditions.

In accordance with a feature of the present invention, the value selection control circuit includes a winding adapted to be energized to cause the value selection control circuit to operate to control the value to which the printing mechanism is set. The winding is coupled to operate under control of the microcomputer. The audible alarm device is coupled to the winding and is energized whenever voltages are applied to the winding. The microcomputer is operable to energize the winding at a first frequency which will cause the audible alarm device to emit an audible sound but will not cause the winding to cause the value selection control circuit to operate to control the value to which the printing mechanism is set. The microcomputer is further operable to energize the winding at a second frequency which will cause the value selection control circuit to operate to control the value to which the printing mechanism is set but will not cause the audible alarm device to emit an appriciable audible sound.

BRIEF DESCRIPTION OF THE DRAWINGS

A complete understanding of the present invention may be obtained from the following description of the preferred embodiment thereof, when taken in conjunction with the accompanying drawings wherein like reference numerals designate similar elements in the various figures, and in which:

FIG. 1 is a perspective view of an electronic postage meter partially broken away to expose the piezoelectric audio transducer and other meter circuit components, and embodying the present invention;

FIG. 3 is a series of wave forms helpful in an understanding of the operation of the present invention.

DESCRIPTION OF THE PREFERRED EMBODIMENT

Figure 2B:
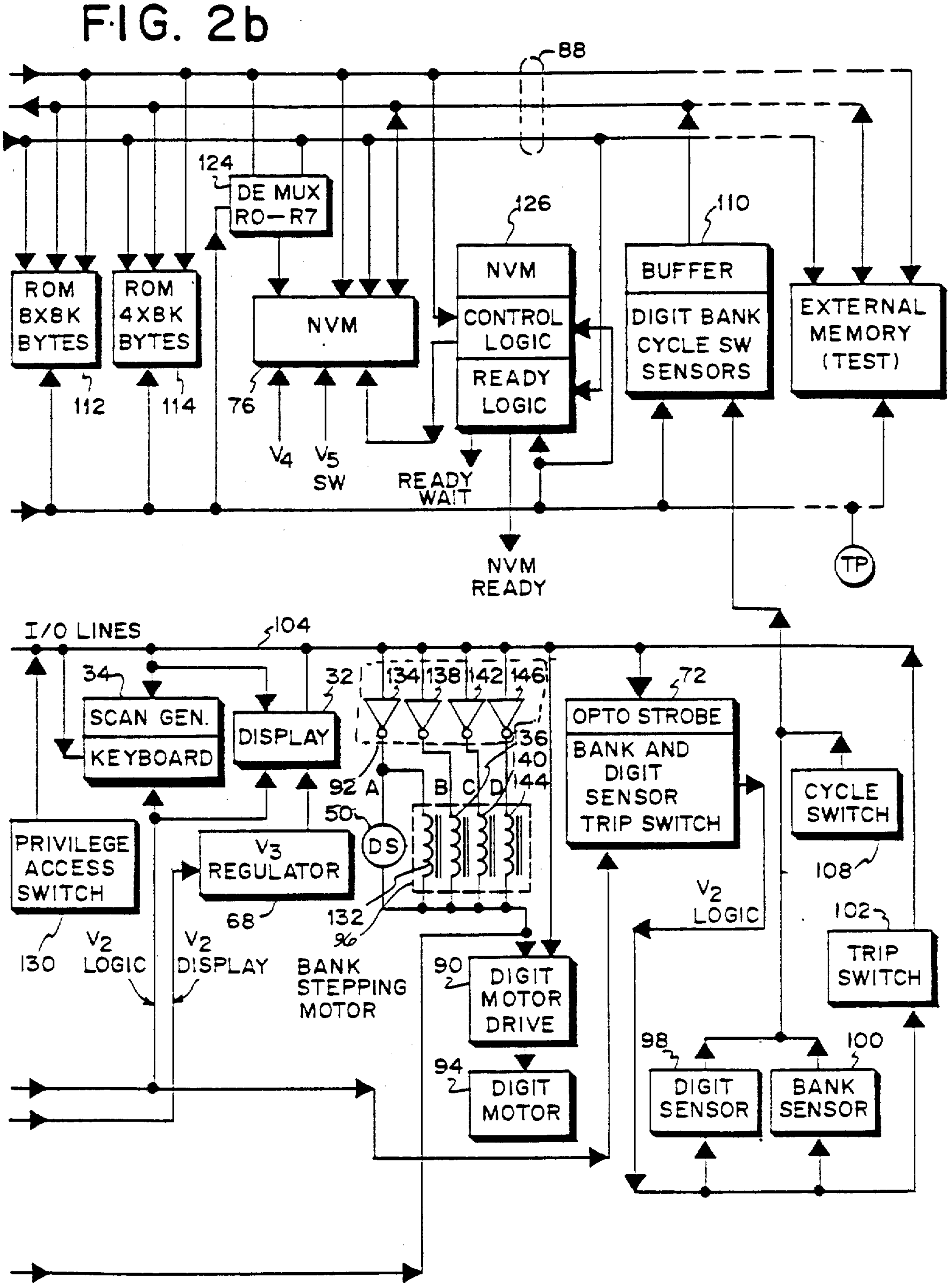
FIG. 2 is an interconnection diagram of FIGS. 2*a* and 2*b* which, when taken together, is a detailed block diagram of the electronic circuitry for the electronic postage meter shown in FIG. 1.

Reference is now made to FIG. 1. The electronic postage meter shown in FIG. 1 may be mechanically constructed in accordance with the electronic postage meter shown in U.S. Pat. No. 4,579,054 for STAND-ALONE ELECTRONIC MAILING MACHINE. The disclosure of the Buan and Eckert application is hereby incorporated herein by reference.

The electronic postage meter 12 shown in FIG. 1 includes a housing 14 having a hinged lid 16. The structure forms a slot 18 with a closed end 20. An envelope is placed on a deck 22 when inserted into slot 18 for the printing of postage on the envelope.

Housing 14 includes a cover with a nested electromagnetic insulating shield 26. Housing 14 with its nested shield 26 are attached to an electromagnetic shield type meter base 28. The housing 14 with its nested shield 26 and shield type base 28 form an electromagnetic radiation shield for the sensitive electronic accounting circuits of the meter which are mounted on a printed circuit board 30. The power supply for the electronic circuits are also mounted within the electromagnetic radiation shield afforded by the housing.

A display 32 and a keyboard 34 are supported within the meter housing. The display 32 is aligned with an opening 24 in the cover 14. The keyboard 34 serves as a means for inputting data into the electronic postage meter. The keyboard 34 includes a plurality of keys which extend through openings 36 of the control panel 38. The keyboard may include keys for selecting the value of postage to be printed by the postage meter and for effecting other user operations.

Located under the lid 16 are a plurality of thumb wheels 40 which are mechanically connected to the date printing portion of the meter printing mechanism diagrammatically shown at 42. The details of the printing mechanism are described fully in the above-noted U.S. Pat. No. 4,579,054 for STAND-ALONE ELECTRONIC MAILING MACHINE. The keys of the meter keyboard 34 may be membrane switches as for example of the type shown in U.S. Pat. No. 4,336,529 for POSTAGE METER HAVING SHIELDED KEYBOARD TO PROTECT AGAINST ELECTROMAGNETIC RADIATION. If a switch arrangement of this type is employed, piezoelectric transducer 50 may emit an audible sound when any of the keys are depressed.

The electronic postage meter includes a key-type on/off switch 44. The switch 44 is operable so that power obtained via the meter AC power cord 46 energizes the internal power supplies of the meter. The power supplies, in turn, energize the electronic components 48 mounted on the printed circuit board 30. A piezoelectric audio transducer 50 is mounted on the printed circuit board 30. The piezoelectric audio transducer 50 may be of the type manufactured by Products Unlimited, Inc. of Dayton, Ohio and designated Series AT-20. The device is an electroaccoustic transducer which contains no electronics and transforms AC voltages to sound pressure waves. Devices of this type will also generate an AC voltage across its terminals when stimulated by mechanical pressure or when stimulated with a sound pressure wave. The details of interconnection and operation of the piezoelectric device are described in greater detail in connection with FIGS. 2 and 3 of the present application. It is noted that the piezoelectric audio transducer is physically mounted on the printed circuit board 30 within the meter housing 34.

Reference is now made to FIG. 2. Power is supplied to the electronic postage meter from a source of AC voltage, such as 115 volts, a 60 hertz, via the AC power cord 46 and through key switch 44. The AC voltage is applied to the meter through a temperature dependent "hot" switch 52. The "hot" switch cuts off power to the postage meter to protect the electrical components if the temperature within the meter rises above a preset limit, nominally 70° C. The "hot" switch 52 is connected to an AC drive motor 54 through an RF filter 56 and an opto-triac 58 which provides isolation between the AC supply and the control logic for the meter. The "hot" switch 52 is also connected to a transformer 60 protected by a fuse 63.

The output of the transformer 60 is coupled to a preregulator 62 through a temperature dependent "cold" switch 64. The "cold" switch 64 cuts off power to the preregulator 62 if the temperature within the meter drops below a preset limit nominally 0° C. The preregulator 62 provides an output voltage of a predetermined range to a switcher or switching regulator 66 which generates a +5 volts output voltage, and the voltages for generating both −12 volts and −30 volts.

The +5 volts output from switcher 66 is applied to a +3 volts regulator 68 and then to display 32. The +5 volts from the switcher 66 is also applied to a +5 volts filter 70 which provides +5 volts for the logic circuits. Specifically, the +5 volts are applied to the keyboard 34, the display 32, and bank digit and trip sensor logic 72 and to the integrated circuits The unregulated −12 volts is applied to a −12 volts regulator 74 and then to the non-volatile memory 76 of the meter.

The non-volatile memory 76 of the meter may be an MNOS type non-volatile memory. The memory is employed to retain critical accounting information when power is removed from the meter. This accounting information may include a descending register, that is, the amount of postage stored within the meter available for further printing. This descending register is recharged with additional postage value available for printing as a user pays funds to the postal authorities for additional postage. As postage is printed, the amount of postage available for printing is subtracted from the amount stored in the descending register. The information may be temporarily retained in a volatile memory and transferred into the non-volatile memory when the meter is intentionally powered down or when a power failure occurs.

Other critical accounting registers may also be resident in the non-volatile memory including an ascending register. This register continually increments and registers the total amount of postage printed by the meter. A third accounting register which may be resident in the non-volatile memory is a control sum register. This is the sum of the descending and ascending register. The control sum register remains fixed as the ascending register increments up and the descending increments down with the printing of postage. The amount of the control sum register increases each time the meter is recharged with additional postage. Other information critical to the meter may also be stored in the non-volatile memory. Methods for recharging an electronic postage meter of the type disclosed in the present application are shown in the aforementioned U.S. Pat. No. 3,978,457 for MICROCOMPUTERIZED ELECTRONIC POSTAGE METER SYSTEM and in the U.S. Pat. No. 4,097,923 for REMOTE POSTAGE METER CHARGING SYSTEM USING AN ADVANCED MICROCOMPUTERIZED POSTAGE METER. The meter recharging system shown in U.S. Pat. No. 4,097,923 enables a user to remotely recharge the postage meter with any amount of desired postage avoiding the need to carry the postage meter to a postal authority facility to be recharged.

The unregulated −30 volts output from the switcher 66 is also applied to a −30 volts regulator 78 and then to a −30 volts switch 80. Switch 80 switches its output voltage on and off in response to the requirements for writing data into the non-volatile memory as dictated by the program resident in the meter. The output of the −30 volts switch 80 is applied to the non-volatile memory 76. The −30 volts supply is also connected to the power on reset 82 of the microprocessor 84 which controls the operation of the meter. The +5 volts from switcher 66 is also supplied to one input of the power on the reset 82.

A low voltage sensor 86 also receives one of its inputs from the +5 volts output from switcher 66 and its other input from the preregulator 62. The output from the low voltage sensor 86 is applied to the microprocessor 84. The low voltage sensor 86 detects power failure and communicates this through the microprocessor 84 which in turn addresses the RAM through the systems bus 88 to transfer all accounting and other critical data present in the RAM to the non-volatile memory 76. It should be noted that the non-volatile 76 is of the MNOS variety where data integrity will degrade after an excessive number of write/read cycles into a given memory location. To protect against any failure of the non-volatile memory, a system may be employed such as disclosed in U.S. Pat. No. 4,442,501 for ELECTRONIC POSTAGE METER WITH WEAK MEMORY INDICATION. In accordance with systems of this type, the service department is alerted to the possibility of the need to replace a non-volatile memory during a remote recharging operation as is described in more detail in the patent.

Another output from the preregulator 62 in the form of +24 volts is applied to the digit motor drive 90 and to the bank motor drive shown generally at 92. The bank motor drive 92 is described hereinafter in greater detail. The digit motor drive 90 drives the digit motor 94 while the bank motor drive 92 drives the bank motor 96. It should be noted that a suitable arrangement for the interconnection of the bank motor, the digit motor and the printing mechanism is shown in detail in U.S. Pat. No. 4,287,825 for PRINTING CONTROL SYSTEM. The bank motor 96 selects the particular printing wheel (bank) which is to be activated. The digit motor 94 selects the particular value (digit) of the selected printing wheel which is to be set.

An output strobe from the RAM I/O Timer 106 is buffered through buffer driver circuits in opto strobe 72 and applied to digit sensor (encoder) 98, bank sensor (encoder) 100, and trip switch sensor 102. The opto strobe applies power to the digit sensor 98, the bank sensor 100, and the trip switch sensor 102. The output from the trip switch sensor 102 is applied to the input/output (I/O) lines 104 which are coupled to the RAM I/O Timer 106. The output from the digit sensor 98, bank sensor 100 and a cycle switch 108 are applied to a storage buffer 110.

During power-up when the key switch 44 is closed and the AC line voltage energizes the electrical components previously described, an initialization process will occur. The initialization may include a hard and/or soft initialization process as disclosed in the aforementioned U.S. Pat. No. 4,301,507 for ELECTRONIC POSTAGE METER HAVING PLURAL COMPUTING SYSTEMS.

In operation, the microprocessor 84, under control of the read-only memory (ROM) 112 and possibly the auxiliary ROM 114, communicates over address bus 116 and control bus 118 with the device select chip 120. The modules to be addressed by the device select chip 120 are the RAM 106, the ROM 112, the auxiliary ROM 114, a demultiplexer 124, non-volatile memory logic circuits 126 and buffer 110. The RAM portion of the RAM I/O timer 106 provides the working memory for the postage meter microprocessor 84 during operation of the electronic meter. The ROM 112 stores the operating program for the meter. The auxiliary ROM 114 may be used to provide additional program storage space above that provided by ROM 112. The non-volatile memory 76 provides storage, as previously noted above, for all critical information for the meter and retains such information when the meter is not energized. Information is copied from the non-volatile memory 76 into the RAM portion of the RAM I/O timer 106 during power-up. During an intentional power-down or during an unintentional power failure, information is transferred from the RAM into the non-volatile memory 76. The demultiplexer 124 latches the lower 8 bits of address information that defines a particular location which is chosen immediately thereafter as is known with microprocessor of the 8085 series. The non-volatile memory logic 126 controls the mode of operation of the non-volatile memory 76 and also provides READY WAIT and NON-VOLATILE MEMORY READY signals to microprocessor 84 to indicate the presence of the slower speed non-volatile memory 76 as active on the bus 88.

As previously mentioned, the digit sensor (encoder) 98, bank sensor (encoder) 100 and cycle switch 108 whose current state is read, i.e. "Home" or "In Cycle", apply input signals to the buffer 110 which sends output signals over data bus 128 to the microprocessor 84 for storage in the proper locations in the RAM portion of the RAM I/O timer circuit 106.

The RAM I/O timer 106 is also electrically coupled to I/O lines 104 to transmit or receive data from, the trip switch sensor 102, the display 32, keyboard 34 and a privilege access switch 130, if present. The privilege access switch 130 may be used in applications which require manual recharging of the postage meter. The switch 130 which may be housed in a compartment having an access door with a breakable government seal as disclosed in the above-noted U.S. patents. Access to this switch is limited only to authorized individuals such as individuals at the Post Office charged with responsibility for recharging the descending registers of postage meters with additional postage.

Referring now to the bank stepping motor portion of FIG. 2, an integrated circuit has a plurality of drivers coupled to the I/O lines 104. The drivers are selectively turned on and off under the control of the microprocessor 84. The drivers may be a part of an integrated circuit such as an ULN 2003A manufactured by Sprague. The drivers provide a ground return path, not shown, for the windings of the bank stepper motor 96. The bank stepping motor 96 may be a stepping motor of the type marketed by Airpax, Molon or others. Motors of this type provide 7½ degrees of rotation for each energization or step of the windings. It should be recognized that other types of motors and solenoids driven by devices can be substituted for the stepping motor and used in the system disclosed in this application.

The windings of the bank stepping motor are connected to the +24 volts output from the preregulator 62. Specifically, a first motor winding 132 is connected to driver 134, a second winding 136 is connected to driver 138, a third motor winding 140 is connected to driver 142, and a fourth motor winding 144 is connected to driver 146. The piezoelectric audio transducer 50 is connected in parallel with the first stepper motor winding 132. These windings are related to the wave forms shown in FIG. 3. The wave form A of FIG. 3 relates to the voltages developed across winding 132, wave form B relates to the voltages developed across winding 136, wave form C relates to the voltages developed across winding 140, and wave form D relates to the voltages developed across winding 144.

The piezoelectric electric audio-transducer 50 when energized in accordance with the present invention emits an audible alarm. The alarm alerts a postage meter user that a predetermined condition exists. Examples of various predetermined conditions where it is desirable to alert the meter user are explained in greater detail hereinafter but, for example, may signify that the meter should be turned off. This may be desired because of non-use of the meter for a predetermined period of time and may indicate a possible lack of knowledge by the meter user that the meter is energized.

In operation, as can be seen in FIG. 3, the microprocessor selectively switches the driver units 134, 138, 142, and 146 on to provide a ground return for the motor windings. The circuit path is from the preregulator 62 through the selected stepping motor winding 132, 136, 140, and 144 to ground via the driver unit. The nominal energization period for each winding to increment the motor step is approximately 5 miliseconds. An example of this is shown by a zero voltage level period B1. This motor drive voltage while sufficient to cause the stepping motor to progress through its rotation, is of an insufficient frequency to excite the piezoelectric audio transducer to emit an appriciable audible sound. Thus, the motor cycles its operation without causing the transducer to emit an appriciable audible sound since it is being driven far from its resonsonant frequency.

When it is desired to alert the meter user of the existence of a predetermined condition detected within the meter, the microprocessor will selectively energize the driver 134 at a significantly higher frequency than the frequency necessary to drive the motor. This is shown at area A2 of FIG. 3. The microprocessor operates driver 134 to turn on and off at a higher frequency, for example, in the range of two to three kilohertz. At this frequency, the inductence associated with the winding 132 exhibits a relatively high impedence. Thus, a low current flows through the winding 132. The current is insufficient to drive the stepping motor to rotate. The frequency, however, is within the range of resonant frequencies for the piezoelectric audio transducer 50, and the current is sufficient to energize the piezoelectric audio transducer to emit a loud sound. The audible sound provides an alarm to warn the meter user that a predetermined condition exists within the meter.

A predetermined condition where an audible may be generated is as a warning to turn off the meter. This can be because the meter has not been used for a period of time as shown diagrammatically in FIG. 3 by the HOLDING portion of the wave forms. Reminding users to turn off the meter in such circumstances would tend to reduce the on time for the meter and thereby reduce the electric stress on the electrical components. It is noted that this may be desirable even though causing more frequent meter on and off cycles will increase the number of times the information is written into and read out of the MNOS type non-volatile memory 76 since MNOS memories of this type have a very large number of READ/WRITE cycles for each memory location before data integrity is degraded. Moreover, this present system, if desired, can be used in conjunction with the memory protection failure system disclosed in the previously noted U.S. Pat. No. 4,442,501 for ELECTRONIC POSTAGE METER WITH WEAK MEMORY INDICATION.

The audible sound warning, for example, can be used to alert a user that the temperature within the meter is rising to a particular level which might cause the "hot" switch to be actuated allowing the user to close down the meter. Coversely, the alarm can be actuated to warn a user that the temperature is going to such a low level such that the "cold" switch 64 might be actuated and again allowing the user to close down the meter. Other examples where an audible sound may be desirable are to alert the user that an ink cartridge for the meter should be replaced, that a service call should be generated, that a predetermined number of days have elapsed and the meter requires governmental inspection, or that the postage value stored in the meter and available for printing is below a given level.

Each of the various conditions actuating the user alarm require that the condition be detected and the existence of the condition signaled to microprocessor 84. For example, the actuation of key switch 44 can start a count down timer 148 to operate. Each time the meter is operated, the count down timer is reset and recommences to count down. If the count down timer reaches a zero count, that is, count down to zero, it signals the microprocessor which, in turn, under control of its operating program, energizes driver 134 to cause transducer 50 to emit an audible alarm. It should be recognized that the count-down time function can be provided in the operating program for the meter rather than by employing count-down timer 148.

It should be recognized that the audible alarm can be coded so that the alarm provides information to the user as to a particular type condition. For example, a 3 second alarm followed by a 5 second pause and another 3 second alarm can signify low postage while 10 second alarm followed by a 5 second pause and another 10 second alarm can signify the need to initiate a service call. Other uses of the audible alarm is to issue a short tone burst on the operation of any key. This is common with membrane keyboards which lack tactile feedback, as disclosed in the above-noted U.S. Pat. No. 4,336,529 for POSTAGE METER HAVING SHIELDED KEYBOARD TO PROTECT AGAINST ELECTROMAGNETIC RADIATION.

From the foregoing, it should be recognized that microprocessor controlled drive circuits have been provided to control the postage meter stepping motor winding energization to selectively drive either the stepper motor to rotate or the piezoelectric audio transducer to emit an audible alarm. Thus, without the need additional parts other than the piezoelectric audio transducer and without the need (unless available and desired) to use or using an additional microprocessor port (which could require the utilization of a more expensive microprocessor having additional I/O ports), a postage meter user warning system has been provided. It should be recognized that the piezoelectric audio transducer, or other similar transducer device, can be coupled to a winding of the digit stepper motor 94 in the same manner that it has been coupled to bank stepper motor winding 132. Moreover, the piezoelectric device can also be mounted in other suitable inductive loads with long time electrical and mechanical response times which are energized under microprocessor control and have similar operating requirements as that of the stepper motor winding, should they exist within the meter, and achieve the same benefit of the present arrangement, for example solenoids.

While this invention has been disclosed and described with reference to a single embodiment thereof, it will be apparant, as noted above, that variations and modifications may be made therein. It is, thus, intended in the following claims to cover each variation and modification as falls within the true spirit and scope of the present invention.

What is claimed is:

1. In an electronic meter of the type having settable means for printing postage, an electronic accounting circuits in electrically responsive communication with said printing means, and a value selection control circuit for controlling the value to which said printing means is set, the improvement comprising:

said electronic accounting circuits including a microcomputer in suitable electrical communication with said value selection control circuit to control the operation of said value selection control circuit;

an audible alarm device electrically controlled by said microcomputer, said audible alarm device selectively energized by said microcomputer upon the occurrence of selected precondition of said electronic accounting circuits to emit an audible sound said audible alarm being responsive to a high electrical resonance instigated by said microcomputer;

a housing enclosing said accounting means, said printing means, said value selection control circuit and said audible alarm device to provide mechanical security and electromagnetic radiation shielding for said components; and said value selection control circuit includes drive means responsive to instigation of said microcomputer and having an inductive load of low electrical resonance for controlling a mechanism with a low response time to energization of said inductive load.

2. An electronic postage meter as defined in claim 1 wherein said audible alarm device is connected in parallel with said inductive load.

3. An electronic postage meter as defined in claim 1 or 2 wherein said audible alarm device is operated by said microcomputer to emit an audible alarm when said printing means has not been operated for a predetermined period of time.

4. An electronic postage meter as defined in claim 1 or 2 wherein said electronic accounting circuits store the value of postage available for printing and said audible alarm device is operated by said microcomputer to emit an audible alarm when less than a predetermined value of postage remains in said meter for printing.

5. An electronic postage meter as defined in claim 1 or 2 wherein said audible alarm device is operated by said microcomputer to emit an audible alarm when a service call should be initiated by a meter user.

6. An electronic postage meter as defined in claim 1 or 2 further including a keyboard in suitable electrical communication with said microcomputer and wherein said audible alarm device is operated by said microcomputer to emit an audible alarm when a key on said keyboard is operated.

7. An electronic postage meter as defined in claim 2 wherein said audible alarm device is a piezoelectric audio transducer.

8. An electronic postage meter as defined in claim 7 including a printed circuit board positioned within said housing and said piezoelectric audio transducer is mounted on said printed circuit board.

9. An electronic postage meter as defined in claim 7 wherein said drive means includes a motor in driving communication with said printing means, and said piezoelectric audio transducer is in electrically responsive communication with said value selection control circuit.

10. An electronic postage meter as defined in claim 9 wherein said motor includes a winding which when energized causes said motor to operate, and said piezoelectric audio transducer is electrically bridged suitably across said motor winding.

11. An electronic postage meter of the type including settable printing means for printing postage, an electronic accounting circuit in electrically responsive communication with said printing means for accounting for postage printed by said printing means, and a value selection control circuit in electrical communication with said printing means for controlling the value to which said settable printing means is set, the improvement comprising:

said value selection circuit comprising a winding electrically energized to cause said value selection circuit to operate to control the value to which said settable printing means is set;

said electronic accounting circuit including a microcomputer;

means for providing electrical communication between said value selection circuit and said microcomputer such that said microcomputer controls the energization of said value selection control circuit winding;

an audible alarm device in electrical communication with said value selection control circuit winding;

said microcomputer energizing said value selection control circuit winding at a first frequency which will cause said audible alarm device to emit an audible sound but will not cause said value selection control circuit winding to cause said value selection control circuit to operate to control the value to which said settable printing means is set; and said microcomputer further energizing said value selection control circuit winding at a second frequency which will cause said value selection control circuit to operate to control the value to which said settable printing means is set but will not cause said audible alarm device to emit an audible sound.

12. An electronic postage meter as defined in claim 11 wherein said piezoelectric audio transducer is connected in parallel with said value selection control circuit winding.

13. Electronic postage meter as defined in claim 11 wherein said means for providing electrical communication between said value selection control circuit winding and said microcomputer includes a driver amplifier.

14. An electronic postage meter as defined in claim 13 wherein said audible alarm device is a piezoelectric audio transducer.

15. An electronic postage meter, comprising:

first means for printing postage, said postage printing means including settable members to be set to selected values of postage for printing;

second means in communication with said printing means for operating said postage printing means settable members to be set to selected values of postage for printing, said second means including a winding electrically energizable to cause said second means to operate;

third means for generating an audible tone, said third means suitably bridged across a said second means winding;

fourth means in suitable electrical communication with said second means winding and to said third means for energizing said second means and said third means to operate; and fifth means in suitable electrical communication with said fourth means for controlling said fourth means to energize said second mean and said third means at a first frequency such that (1) said second means will operate to set said printing means settable members and (2) said third means will not operate to generate an audible tone and at a seond frequency such that (1) said third means will operate to generate an audible tone and (2) said second means will not operate to set said printing means settable members.

16. An electronic postage meter as defined in claim 15 wherein said second means is a motor and said third means is a transducer.

17. An electronic postage meter as defined in claim 16 wherein said transducer is a piezoelectric audio transducer.

18. An electronic postage meter as defined in claim 17 wherein said fifth means is a microcomputer.

19. An electronic postage meter as defined in claim 18 wherein said second frequency is in the kilohertz range of frequencies.

20. An electronic postage meter as defined in claim 18 wherein said first frequency is in the range of 200 hertz.

21. An electronic postage meter as defined in claim 18 wherein said second frequency is in the kilohertz range of frequencies and wherein said first frequency is in the range of 200 hertz.

* * * * *